June 5, 1956
H. D. LYNCH
2,748,854
DOG DOOR
Filed June 23, 1950
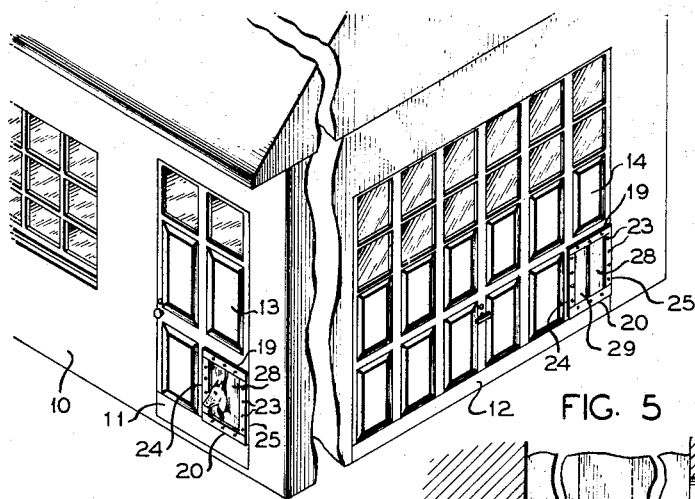
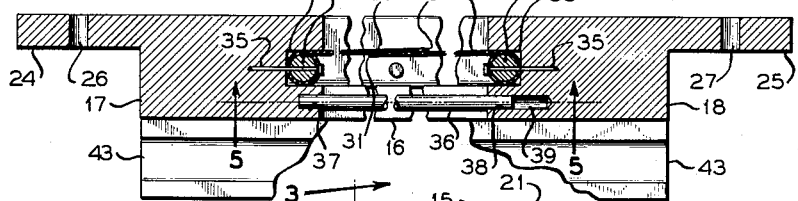
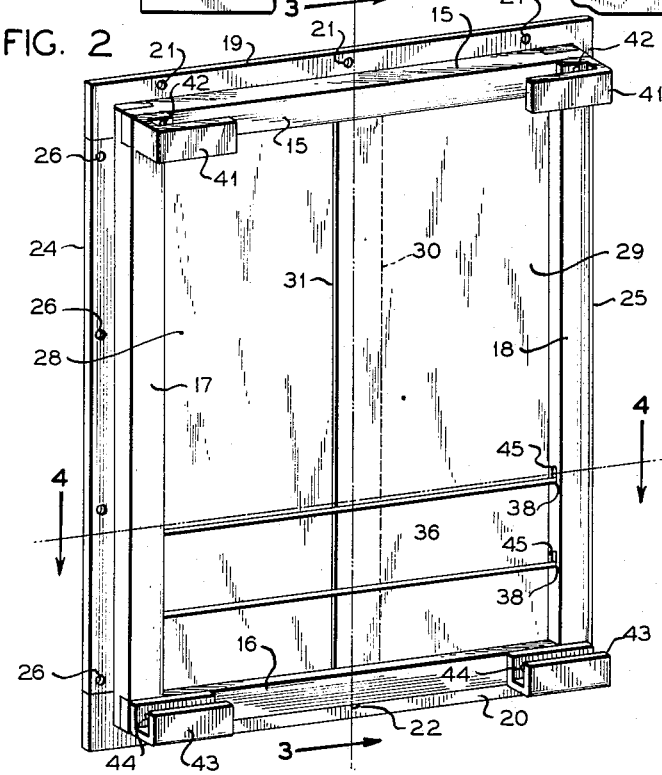
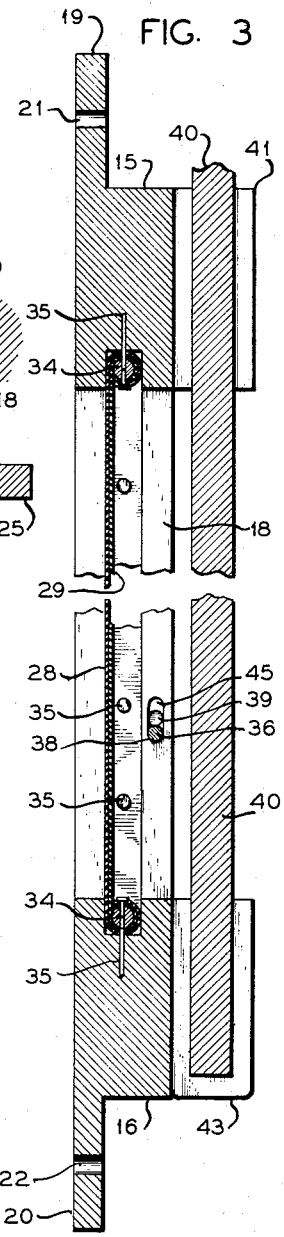
INVENTOR.
H. D. LYNCH
BY
A. Yates Dowell
ATTORNEY

United States Patent Office 2,748,854
Patented June 5, 1956

2,748,854

DOG DOOR

Harold D. Lynch, Evansville, Ind.

Application June 23, 1950, Serial No. 169,926

2 Claims. (Cl. 160—179)

This invention relates to closures and more particularly to a closure permitting the passage of animals, persons, and objects therethrough, but presenting a barrier to the weather.

Specifically, the invention relates to a dog door or a closure through which a dog or other animal may pass, but which will remain closed except when the body of the animal is within the doorway.

Various types of devices have been employed in homes, garages, dog kennels and other structures in order to permit the dog or other animals to have ingress and egress. However, such devices have not been satisfactory for certain reasons, including the fact that they have not excluded the weather, have been cumbersome, expensive, and awkward to operate.

It is an object of the invention to provide a door of simple and inexpensive construction which can be easily installed, and will effectively exclude the weather but which will permit free passage of the dog or animal therethrough.

A further object of the invention is to provide a dog door the size of which can be varied to suit requirements, and one in which the door may easily be barred at will to prevent passage therethrough.

Further objects and advantages of the present invention will be apparent from the following description taken in conjunction with the accompanying drawing, wherein:

Fig. 1 is a perspective of a building illustrating the application of the invention;

Fig. 2 a rear perspective of the door per se;

Fig. 3 a section along the line 3—3 of Fig. 2;

Fig. 4 a section along the line 4—4 of Fig. 2; and

Fig. 5 a section along the line 5—5 of Fig. 4.

Briefly stated, the invention comprises a door frame with a pair of flexible and resilient sheets which overlap along the center line of the frame, and which can be displaced sufficiently to permit the body of an animal to pass therethrough, but not the wind or weather.

With continued reference to the drawings there is disclosed in Figure 1 a dwelling 10 having a door 11 and a built-in garage with a door 12. The house door 11 and garage door 12 have panels 13 and 14, and one of the lowermost panels of each door is removed and replaced by the device of the present invention.

The door of the present invention comprises upper and lower frame members 15 and 16 and side frame members 17 and 18. These upper and lower and side frame members are connected at their corners by mitered joints to form a solid frame. Also the upper and lower frame members have mounting flanges 19 and 20 having apertures 21 and 22 therein for the reception of fastening elements 23, which may be in the form of bolts or the like for securing the upper and lower portions of the frame in operative position. In like manner, the side frame members 17 and 18 are provided with mounting flanges 24 and 25 and are also provided with apertures 26 and 27 for the reception of fastening elements 23.

The space within the frame is closed by means of flexible and resilient sheets 28 and 29, having overlapping edges 30 and 31 which, due to the resiliency of the sheets, can be distorted so as to permit the dog or animal to pass therethrough.

The sheets 28 and 29 may be mounted in any desired manner, however, one preferred way of mounting the same is by providing the side frames 17 and 18 with grooves 32 and 33 for receiving dowels 34 about which the edges of the sheets 30 and 31 are wound with such dowels being secured into position by means of nails or other fastening elements 35. With this construction the amount of the overlap of the edges 30 and 31 of the sheets can be adjusted as desired.

In order to reduce the size of door through which an animal may pass bars 36 may be employed. These bars are adapted to fit into sockets in the side frame members 17 and 18. As illustrated in Fig. 5, the side frame member 17 has a single opening 37 and the side frame member 18 is provided with a corresponding opening 38 and a slightly offset deeper opening 39. Consequently, in the application of the bar 36 one end is inserted into the deep opening 39 and then the bar is moved axially in a manner to retract it from such opening 39 but at the same time the opposite end is moved into the opening 37. The one end of the bar 36 is then allowed to drop into the opening 38, whereupon the bar is incapable of axial movement. With this construction the bars may be easily applied, will remain solidly in position and will restrict the passageway in accordance with the number of bars used and the proximity to the center of the frame.

If desired, to prevent passage through the door, a panel 40 may be employed, such panel being slidable through brackets 41 secured on the inner side of the frame member 15 by means of fastening elements 42 and resting in brackets 43 secured by fastening elements 44. The panel 40 may be constructed of any desired material and is adapted to be readily slid down into position or removed as desired.

If the door is inverted for a smaller animal an additional opening 45 may be employed to serve the same function as the opening 38.

It will be readily understood that the present invention contemplates a relatively simple door which may be easily installed and effectively employed to exclude the weather and permit the passage of animals including humans therethrough as well as objects of every kind and character, even a railway train if desired. Also, by the use of two or more such doors in spaced relation at an entrance or along a passageway the device may be used as a storm door, as an isolation medium in a hospital or between wards housing contagious diseases, as a tempering medium between high differential areas, as a safety door between highly reactionary substances as in a chemical or powder plant, and in numerous other capacities.

It will be obvious to those skilled in the art that various changes may be made in the invention without departing from the spirit and scope thereof and therefore this invention is not limited by that which is shown in the specification or drawings but only as indicated in the appended claims.

What is claimed is:

1. A door for the passage of animals therethrough comprising a door frame having outwardly extending flanges by means of which the frame may be mounted, said frame having opposed grooves in the inner surfaces of its sides, resilient flexible sheet members mounted in and filling said frame and having overlapping edges susceptible of displacement to permit the body of an animal to pass therethrough and to return to its initial position thereafter, dowels secured in said grooves, and having the remote edges of said flexible sheets around the same and readily removable and replaceable bar means for limiting the size of the door opening and consequently the size of the animal which can pass therethrough, said door frame having at one side an opening to receive said bar means and having an opening in the opposite door frame also to receive said bar means, said second opening being of a depth to permit a bar to be inserted into the same and the opposite end of the bar insertable into the first opening and retractible until the bar is seated against the bottom of the first opening, said door frame being provided with upper and lower openings above and below said second opening with said upper and lower openings of less depth than that of said second opening and with the bottoms of said upper and lower openings spaced from the bottom of the first opening, whereby a bar of a length substantially equal to the distance between the bottom of the first opening and that of said upper and lower openings may be inserted into the second opening with its opposite end clearing the door frame and insertable into the first opening whereupon the first inserted end of the bar may gravitate into one of said upper and lower openings whichever is in lowermost position and be fixed against axial movement regardless of which end of the frame is in uppermost position.

2. A door for the passage of animals therethrough comprising a door frame having outwardly extending flanges by means of which the frame may be mounted, said frame having opposed grooves in the inner surfaces of its sides, resilient flexible sheet members mounted in and filling said frame and having overlapping edges susceptible of displacement to permit the body of an animal to pass therethrough and to return to its initial position thereafter, dowels having the remote edges of said flexible sheets around the same and said dowels being secured in said grooves, readily removable and replaceable bar means for limiting the size of the door opening and consequently the size of the animal which can pass therethrough, and means for providing a solid closure for said frame, said means comprising a relatively thin panel member and retaining means adjacent the corners of the rear side of the frame for receiving said panel.

References Cited in the file of this patent
UNITED STATES PATENTS

| | | |
|---|---|---|
| 161,419 | Lockwood | Mar. 30, 1875 |
| 413,010 | Anderson | Oct. 15, 1889 |
| 734,340 | Lampton | July 21, 1903 |
| 1,312,130 | Merrill et al. | Aug. 5, 1919 |
| 1,535,045 | Scheidecker | Apr. 21, 1925 |
| 1,704,945 | Leffert | Mar. 12, 1929 |
| 2,041,258 | Mitchell | May 19, 1936 |
| 2,560,661 | Poovey | July 17, 1951 |